United States Patent
Dai et al.

(10) Patent No.: US 7,882,404 B2
(45) Date of Patent: Feb. 1, 2011

(54) BACKPLANE EMULATION TECHNIQUE FOR AUTOMATED TESTING

(75) Inventors: Xingdong Dai, Bethleham, PA (US);
Geoffrey Zhang, Allentown, PA (US);
Max J. Olsen, Mertztown, PA (US)

(73) Assignee: Agere Systems Inc., Allentown, PA (US)

( * ) Notice: Subject to any disclaimer, the term of this patent is extended or adjusted under 35 U.S.C. 154(b) by 590 days.

(21) Appl. No.: 11/935,759

(22) Filed: Nov. 6, 2007

(65) Prior Publication Data
US 2009/0119554 A1 May 7, 2009

(51) Int. Cl.
*G01R 31/28* (2006.01)
(52) U.S. Cl. .................. 714/716; 714/717
(58) Field of Classification Search ............ 375/229;
326/86; 327/108; 455/108; 70/2; 714/717, 714/716
See application file for complete search history.

(56) References Cited

U.S. PATENT DOCUMENTS

| | | | |
|---|---|---|---|
| 7,164,711 B2 * | 1/2007 | Yang et al. | 375/229 |
| 7,411,422 B2 * | 8/2008 | Clements et al. | 326/86 |
| 7,528,635 B2 * | 5/2009 | Kwasniewski et al. | 327/108 |
| 7,599,431 B1 * | 10/2009 | Anderson et al. | 375/229 |
| 7,620,377 B2 * | 11/2009 | Dwyer | 455/108 |
| 7,693,691 B1 * | 4/2010 | Tao et al. | 703/2 |

* cited by examiner

*Primary Examiner*—David Ton
(74) *Attorney, Agent, or Firm*—Ryan, Mason & Lewis, LLP

(57) ABSTRACT

The present invention implements a method and apparatus for using components within a Serializer/DeSerializer (SerDes) to emulate the effects of a backplane in order to facilitate automated test equipment (ATE) testing of the SerDes. The SerDes includes a transmitter pre-emphasis circuit (TPXE) that pre-emphasizes a transmitted signal and a receiver equalization circuit (RXEQ) that equalizes a received signal. The TPXE includes coefficients that are dynamically programmable.

20 Claims, 7 Drawing Sheets

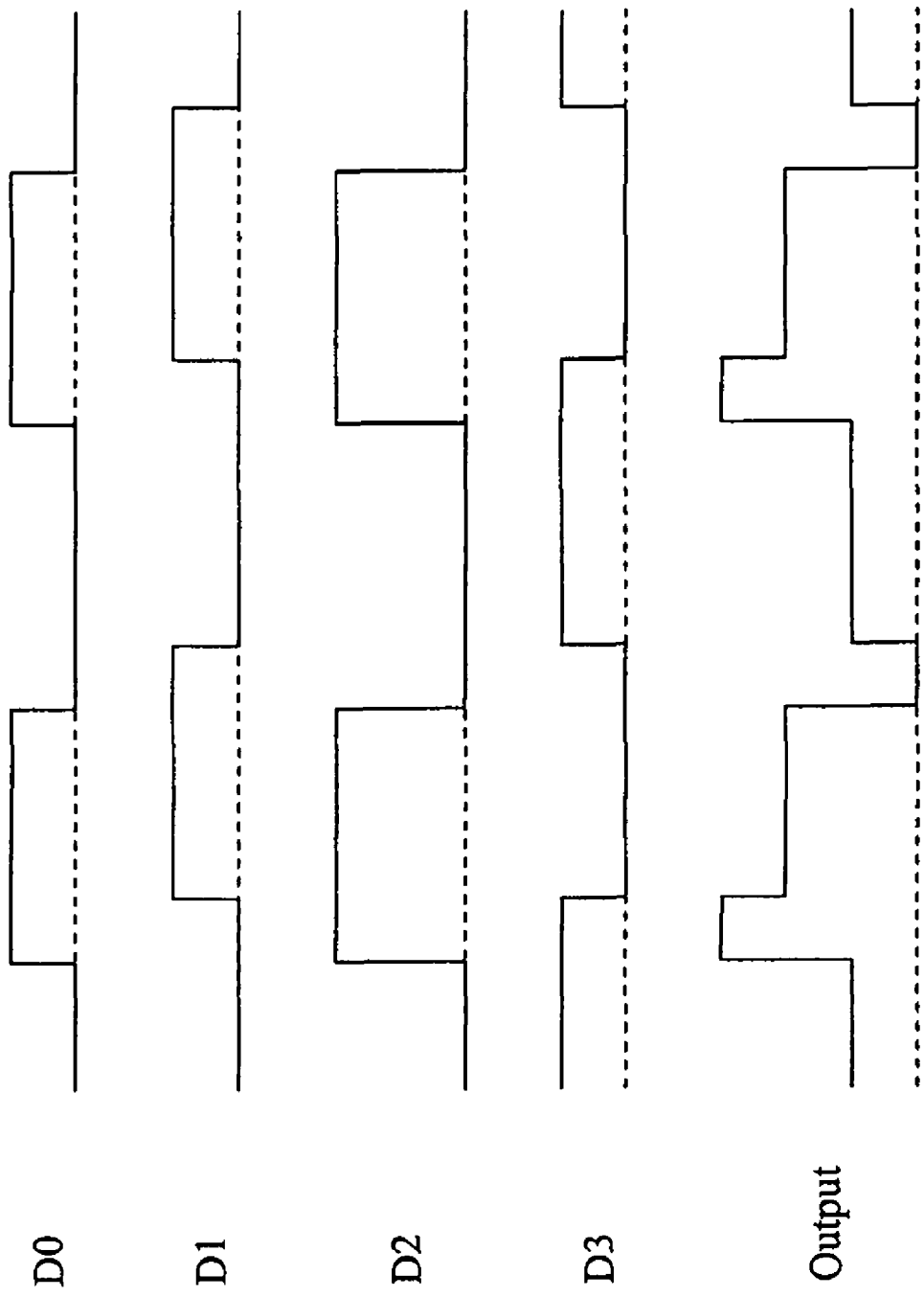

BACKPLANE EMULATION TECHNIQUE FOR AUTOMATED TESTING

FIELD OF THE INVENTION

The invention pertains to communication systems that use a Serializer and De-Serializer (SerDes). More particularly, the invention pertains to a method and apparatus for using components within a SerDes to emulate the effects of a backplane in order to facilitate automated test equipment (ATE) testing of the SerDes.

BACKGROUND OF THE INVENTION

A Serializer/DeSerializer (SerDes) is an important building block in high speed computer networks and data communications systems. In applications that use a SerDes, no clock is included in the transmission of data signals. Instead, a receiver must extract the timing information from a received data signal and establish a data clock which is used to re-time the received data. The function of extracting the timing information is fulfilled by a clock data recovery (CDR) circuit.

In SerDes applications, the data link channel in which data is transmitted (for example through a Printed Circuit Board (PCB) backplane) to the SerDes is usually highly lossy, highly dispersive and bandwidth limited. The channel loss is a strong function of the frequency at which the data is transmitted. This channel loss can result in the occurrence of errors from Inter-Symbol Interference (ISI) in the received data unless there is some form of compensation included in the SerDes.

The ISI of the signal link path can be approximately modeled as a linear system with finite memory. In mathematical terms, this is a finite state machine (FSM), where the system output signals are affected by signals that occur earlier and later in time. FIGS. 1A-1C show an example of the effect of ISI on a bipolar non-return-to-zero (NRZ) digital signal having a pulse width of 1 T (shown in FIG. 1A). FIG. 1A shows the original pulse. FIG. 1B shows the pulse after it has been affected by ISI. Particularly, the NZR signal is time stretched by ISI into an analog signal whose width is roughly 3 T. On an actual backplane, depending on trace length, material, layout, and signal data rate, the width of the distorted signal may extend to many times the one-bit duration of the digital signal and the dispersion may not be evenly distributed, i.e., the leading edge and falling edge may be affected differently. In general, such an ISI-distorted signal can be partitioned into 3 sections: a main cursor, a pre-cursor and a post-cursor. Finally, FIG. 1C shows a discrete signal model that digitally emulates the waveform of FIG. 1B.

Compensation for the channel loss in the data link channel is usually realized by means of equalization techniques on both the transmit side and the receive side of a SerDes. Equalization is a signal processing technique used to compensate the degrading effects of transmission paths. The equalization technique on the transmit side is often called transmitter pre-emphasis (TXPE) or de-emphasis, while that on the receive side is termed receiver equalization (RXEQ). High speed CDR and equalization blocks are typically made of analog and digital circuits that work with clock signal with frequencies in excess of 1 GHz.

The ability to track a certain amount of ISI by the CDR or remove some ISI by the RXEQ is critical to systems using SerDes. In the transmitter, a common equalization technique is to use a TPXE to apply pre-emphasis to boost the signal transitions and hence the higher frequency components, in order to compensate for the low frequency pass nature of the link path. FIG. 2A shows one example of a conventional implementation of a TXPE 200 used for pre-emphasis. An Input signal D0 is split into two signals. The first of the split signals is multiplied by a coefficient Cmain=2 in a main multiplier 204 main to generate a signal D2. The second of the split signals is delayed by one period (1 T) in a delay element 202 and then multiplied by a coefficient Cpost=−1 in a post-cursor multiplier 204 post (resulting in a delayed and inverted version of the input signal) to generate a signal D3. In practice, the values of the coefficients Cpost and Cmain may take on a wide range of values. The values of Cpost=−1 and Cmain=2 are chosen here for illustrative purposes. The multiplied signal D2 and the delayed and multiplied (inverted) signal D3 are input to a summing element 208. The output of the TXPE is the signal generated by the summer 208. FIG. 2B shows waveforms D0, D1, D2, D3 and Output that illustrate the function of the TXPE of FIG. 2A in response to an input signal having a pattern of four 1's and four 0's.

Since the CDR and CDR/RXEQ of a SerDes run at such high data rates, these circuit blocks are limited within an extremely tight timing budget and need to be stringently tested. However, as the data rate of the transmitted data increases beyond multi-gigabits-per-second (Gbps), conventional automated test equipment (ATE) methods of testing the integrity of CDR circuits and the effectiveness of equalization are ineffective.

Conventional ATE testing is inadequate for testing the performance of the CDR and the RXEQ of a conventional SerDes because traditional scan methods are either insufficient or not practicable. Only the amplitude (vertical) of a transmitter signal can be varied with conventional ATE testing, so the channel loss effects of the data link channel cannot be effectively modeled on the high speed, quasi-analog circuits of the CDR and the RXEQ. Due to the short and fixed length traces on ATE testers, signal smearing is minimal and constant for a given data rate. Additionally, implementing variable length traces on an ATE load board or in the ATE tester is not practical, especially when the device under test (DUT) contains dozens or even hundreds of channels. Thus, no meaningful horizontal timing closure is possible to fully test the CDR and the RXEQ blocks of the SerDes. From an eye diagram perspective, the horizontal eye opening is not stressed.

Currently the only way to fully screen the CDR and the RXEQ devices of a conventional SerDes is to use at-speed functional tests in a controlled lab environment, which employs expensive bit-error ratio testers (BERT), high bandwidth real time and sampling oscilloscopes, high speed signal generators, and various backplanes (model or real-world parts). However, this lab method is slow, involves expensive test equipment and requires constant supervision by experienced engineers. Thus, lab testing is not suitable for volume production testing.

If the CDR and the RXEQ devices are not rigorously tested, the devices may contain dormant defects that can deteriorate in the field. Such problems are very difficult to debug once they are in a system and the replacement cost is extremely high. Thus, when SerDes devices containing defects are shipped to customers, it can be very costly to replace them. As a result, there is a need for an efficient ATE-friendly test method to screen a SerDes device, especially the CDR circuits and the RXEQ functional blocks, before they are deployed.

SUMMARY OF THE INVENTION

The present invention implements a method and apparatus for using components within a Serializer/DeSerializer (SerDes) to emulate the effects of a backplane in order to facilitate automated test equipment (ATE) testing of the SerDes. The SerDes includes a transmitter pre-emphasis circuit (TPXE) that pre-emphasizes a transmitted signal and a receiver equalization circuit (RXEQ) that equalizes a received signal. The TPXE includes coefficients that are dynamically programmable.

BRIEF DESCRIPTION OF THE DRAWINGS

FIG. 2B shows waveforms that illustrate the function of the TXPE of FIG. 2A in response to an input signal having a pattern of four 1's and four 0's.

DETAILED DESCRIPTION OF THE INVENTION

A SerDes device according to the present invention has a built-in-self-test (BIST) method that can stress the receiver data with horizontal timing variations (jitter), exercise the CDR and RXEQ logic at speed, and therefore provide much needed functional coverage. In particular, the TXPE circuit of the SerDes of the present invention, the normal function of which is to deliver the inverse characteristics of the link channel, can also function as a finite impulse response (FIR) filter that actually could do the opposite, thus injecting an inter-symbol interference (ISI) component of the jitter into the received data stream. Carefully calibrated, the circuit can approximate the effects of an actual backplane and is digitally tunable. As it is a BIST method, it is efficient, ATE-friendly, and cost effective, thereby making it suitable for the volume production testing of CDR and RXEQ circuits of a SerDes.

Figure 1C:
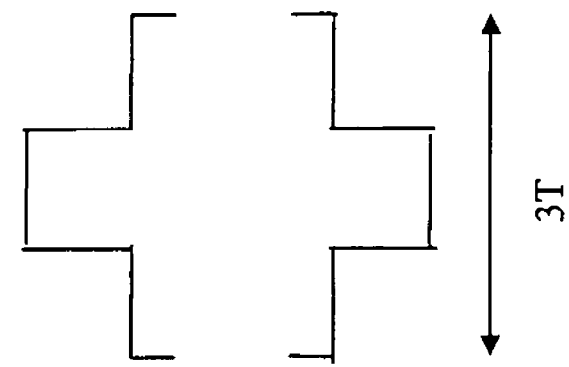
FIGS. 1A-1C show an example of the effect of ISI on a bipolar non-return-to-zero (NRZ) digital signal with a pulse width of 1 T.
Figure 1B:
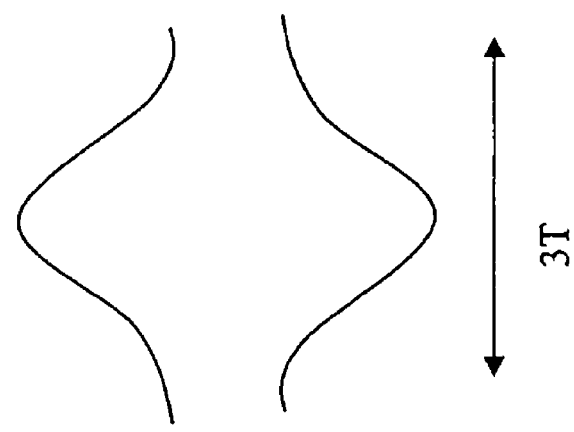
Figure 1A:
Figure 2A:
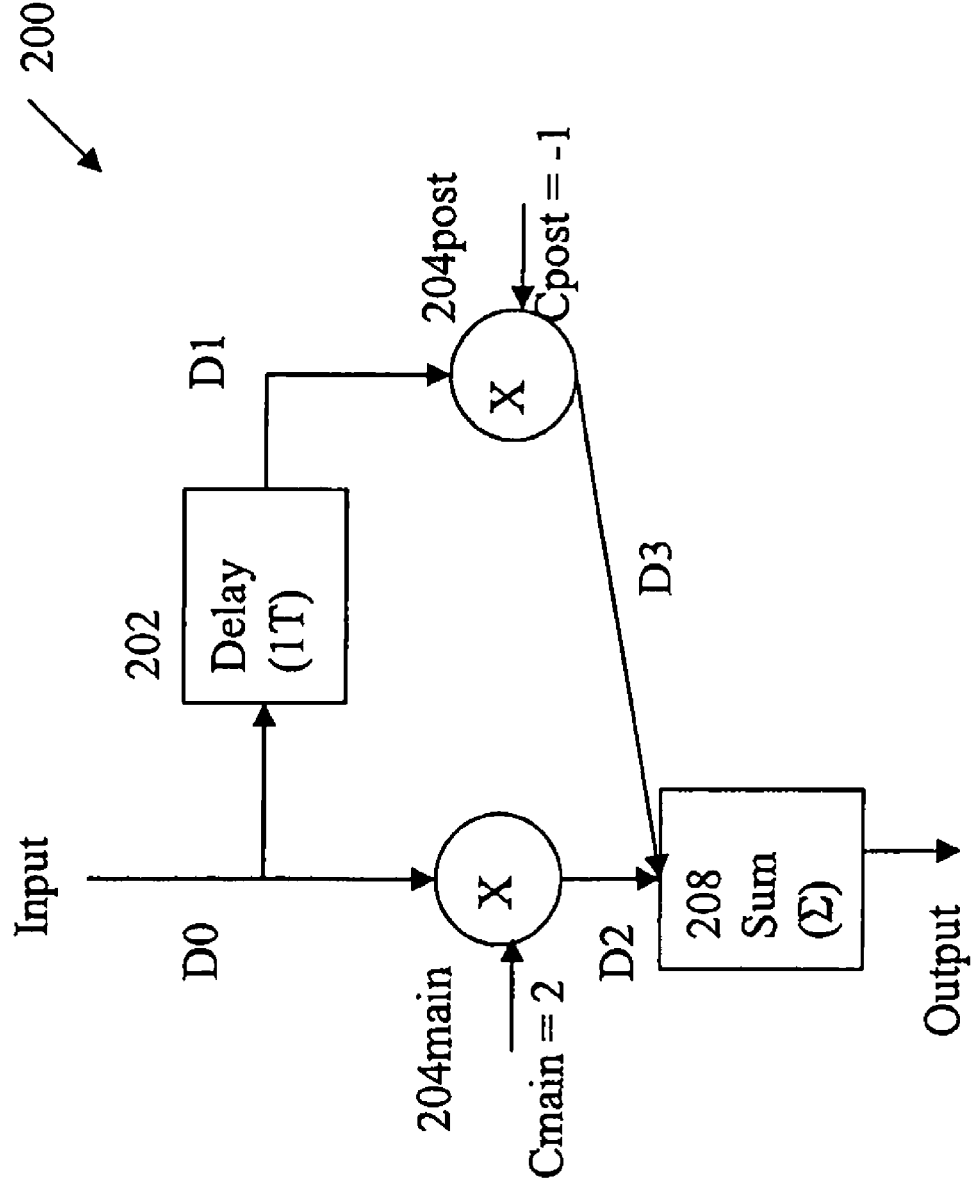
FIG. 2A shows a conventional implementation of a TXPE used for pre-emphasis in a SerDes.
Figure 3A:
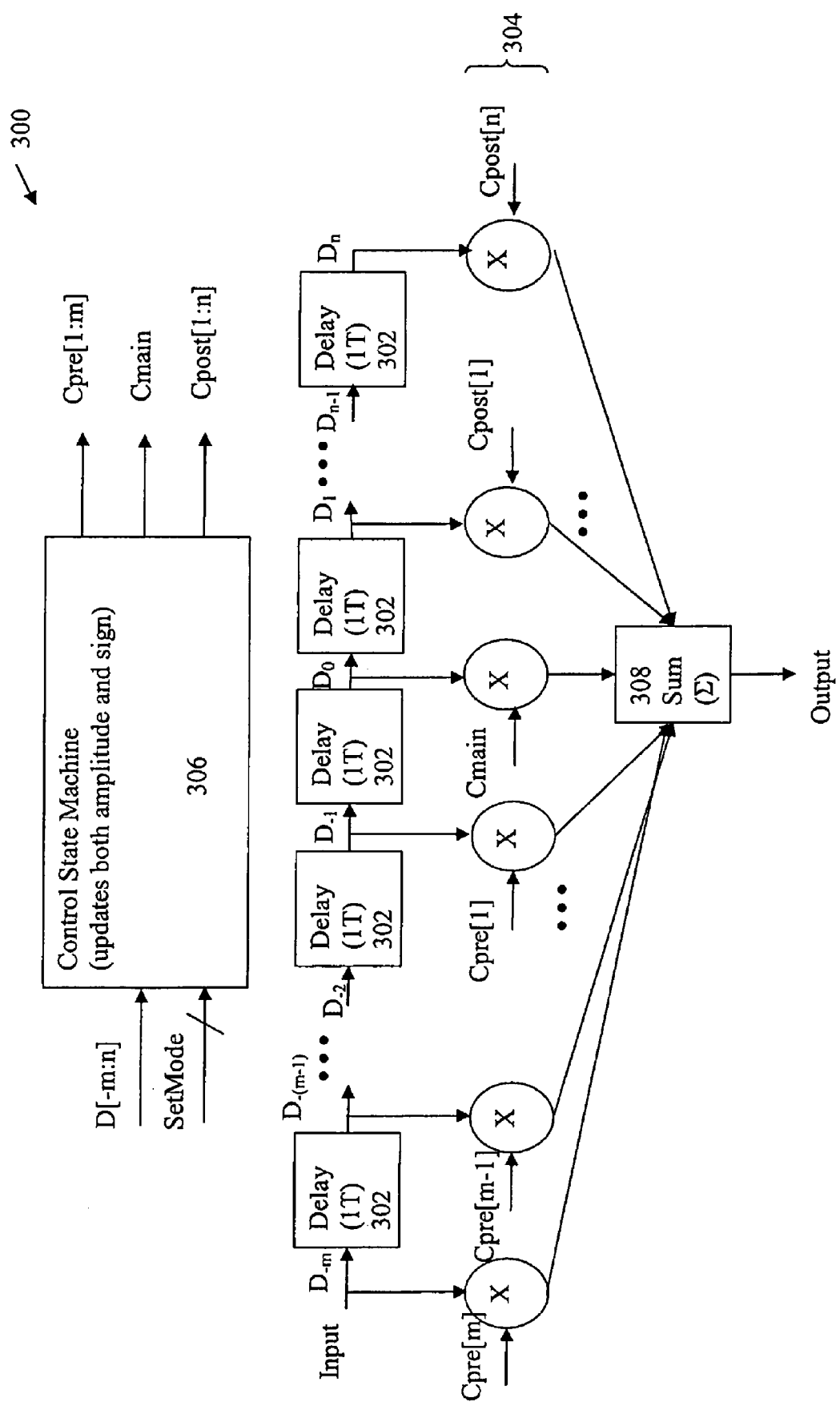
FIGS. 3A-3C show preferred embodiments of a tunable TPXE 300 according to the present invention.

FIG. 3A shows one preferred embodiment of a tunable TPXE 300 of a SerDes 400 (see FIG. 4) according to the present invention. The tunable TPXE 300 includes (m+n) delay elements 302 that are connected serially. Each delay element 302 receives a signal D[x], delays the signal by a time interval (1 T), and outputs the delayed signal D[x+1]. The first delay element 302 receives a signal D[−m] which is the Input signal to the tunable TXPE 300. The last delay element 302 outputs a delayed Input signal D[n] that is delayed by a cumulative time interval of ((m+n)T).

The tunable TPXE 300 further includes multipliers 304 having dynamically tunable coefficients Cpre[m:1]:Cmain:Cpost[1:n], respectively. Each multiplier 304 is a tunable current source. Each of the signals D[−m:n] (delay signals) is input to a multiplier 304 having a coefficient Cpre[m:1]:Cmain:Cpost[1:n] that corresponds to the delay signal D[−m:n]. The signals generated by the multipliers make up a pre-cursor (D[−m:−1]×Cpre[m:1]), main cursor (D[0]×Cmain), and post-cursor (D[1:n]×Cpost[1:n]) of the signal generated by the tunable TPXE 300. The tunable TPXE 300 further includes a summing element 308 that sums the signals output from each of the multipliers 304. The Output signal of the tunable TPXE 300 is the output from the summing element 308.

The tunable TPXE 300 further includes a control state machine 306 that dynamically controls the coefficients Cpre[m:1]:Cmain:Cpost[1:n] of the multipliers 304. The control state machine 306 receives the delay signals D[−m:n] and updates the magnitude and sign of the coefficients Cpre[m:1]:Cmain:Cpost[1:n] by scanning past, current, and future signal bits from the Input signal (delay signals D[−m:n]) to the tunable TPXE 300 in order to achieve emulated ISI effects or other more complicated pre-emphasis waveform shapes. The control state machine 306 includes a SetMode control that can be set to either "ISI output" or "pre-emphasis output". When the SetMode control is set to "pre-emphasis output", the tunable TPXE 300 functions as a conventional TPXE of a SerDes 400 (see FIG. 4). When the SetMode control is set to "ISI output", the tunable TPXE 300 emulates ISI effects in order to facilitate ATE testing of the SerDes 400 (see FIG. 4). The number of delay elements (taps) and multipliers is data rate dependent. Fewer taps are required at lower data rates and more taps are required at higher data rates.

Figure 3B:
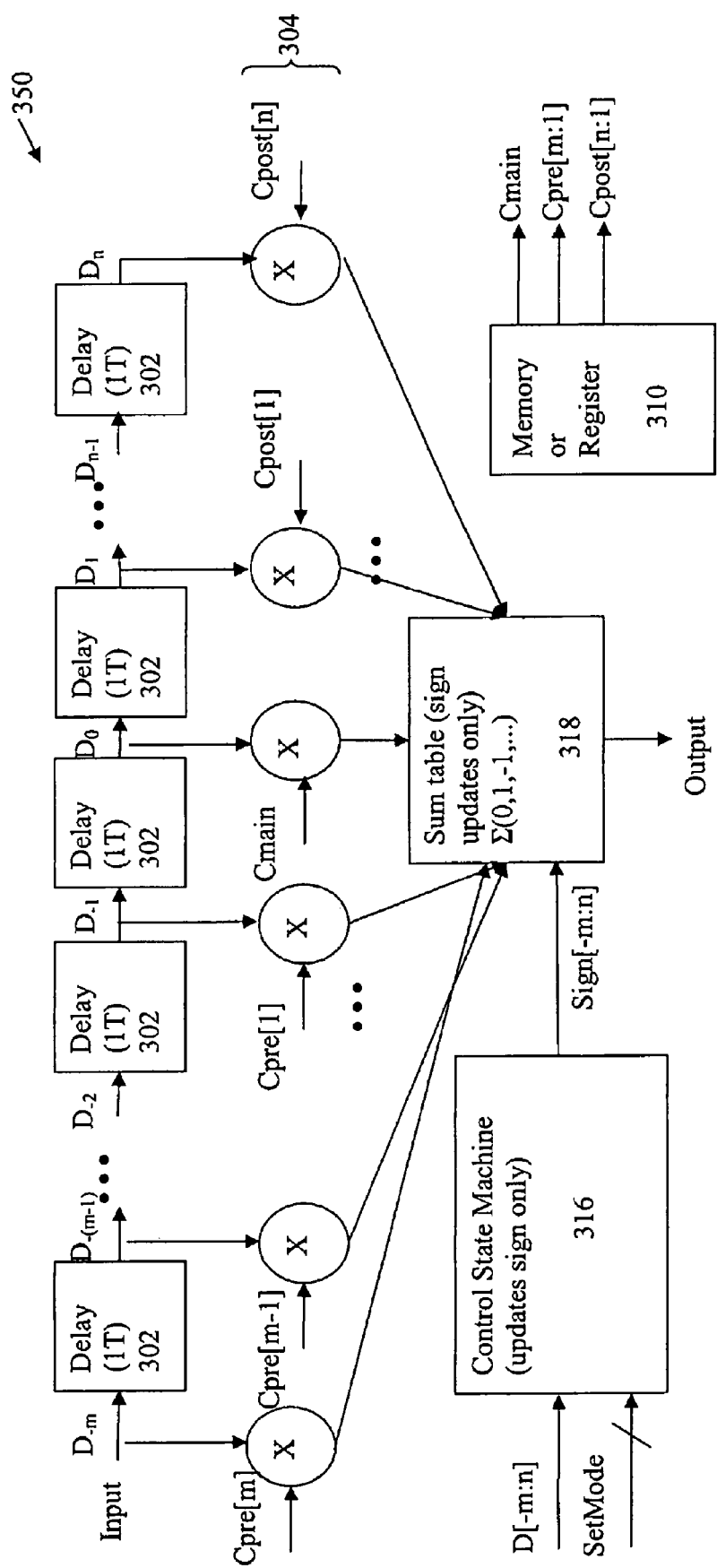

FIG. 3B shows an alternate embodiment of a tunable TPXE 350 of a SerDes 400 (see FIG. 4) according to the present invention. The tunable TPXE 350 includes delay elements 302 and multipliers 304 that are connected in the same way as the TPXE 300 of FIG. 3A. The multipliers 304 are tunable current courses that have tunable coefficients Cpre[m:1]:Cmain:Cpost[1:n], respectively. The tunable TPXE 350 further includes a memory 310 that stores the tunable coefficients Cpre[m:1]:Cmain:Cpost[1:n] and inputs the coefficients to the multipliers 304. Unlike the TPXE 300 of FIG. 3A, the coefficients Cpre[m:1]:Cmain:Cpost[1:n] are not dynamically updated.

The tunable TPXE 350 further includes a dynamically updated summing element 318. The summing element 318 receives the signals output from each of the multipliers 304. The summing element also receives an input signal Sign[−m:n] corresponding to each of the multipliers 304, respectively. Each Sign signal is dynamically updated to have one of three values: 1 for contributing positively, −1 for contributing negatively, and 0 for non-contributing. The summing element 318 sums the products of the signal output from each multiplier 304 multiplied by the corresponding Sign[−m:n] signal. The Output signal of the tunable TPXE 300 is the output from the summing element 318.

The tunable TPXE 350 further includes a control state machine 316 that dynamically controls the Sign [−m:n] signals which are input to the summing element 318. The control state machine 316 updates the value of the coefficients Sign [−m:n] signals by scanning past, current, and future signal bits from the Input signal (delay signals D[−m:n]) to the tunable TPXE 350 in order to achieve emulated ISI effects or other more complicated pre-emphasis waveform shapes. The control state machine 316 includes a SetMode control that can be set to either "ISI output" or "pre-emphasis output". When the SetMode control is set to "pre-emphasis output", the tunable TPXE 350 functions as a conventional TPXE of a SerDes 400 (see FIG. 4). When the SetMode control is set to "ISI output", the tunable TPXE 350 emulates ISI effects in order to facilitate ATE testing of the SerDes 400 (see FIG. 4).

The TPXE 350 of FIG. 3B is simpler than the TPXE 300 of FIG. 3A because less memory is required due the non-datadependent coefficient table. However, the TPXE 350 of FIG. 3B is also less flexible than the TPXE 300 of FIG. 3A because only the Sign [−m:n] signals are dynamically updated. In real silicon implementations, the tunable TPXE's 300 and 350 may suffer in performance due to the limitations on physical resources. A major hurdle is the limited tunable range of current sources (multipliers) 304. In order to create arbitrary fine waveforms that approximate the bandwidth limiting effect of the backplane, or to cancel such an effect, the dynamic range requirement is large. A "perfect" implementation will require significant semiconductor area and consume significant power, which will translate into a high cost for the chip and the system. Area and power could be saved if the tunable current sources were small. However, small current sources may not be able to effectively cancel or model the ISI effects of a targeted backplane.

In the tunable TPXE's 300 and 350, not all of the delay signals D[−m:n] (taps) contribute equally in the emulation of ISI effects from a backplane. Thus, dynamically allocating the limited resources of the semiconductor to the taps that significantly contribute to the Output of the TPXE (away from taps that contribute only minimally to the Output of the TPXE) would allow greater efficiency in the use of power and area.

Figure 3C:
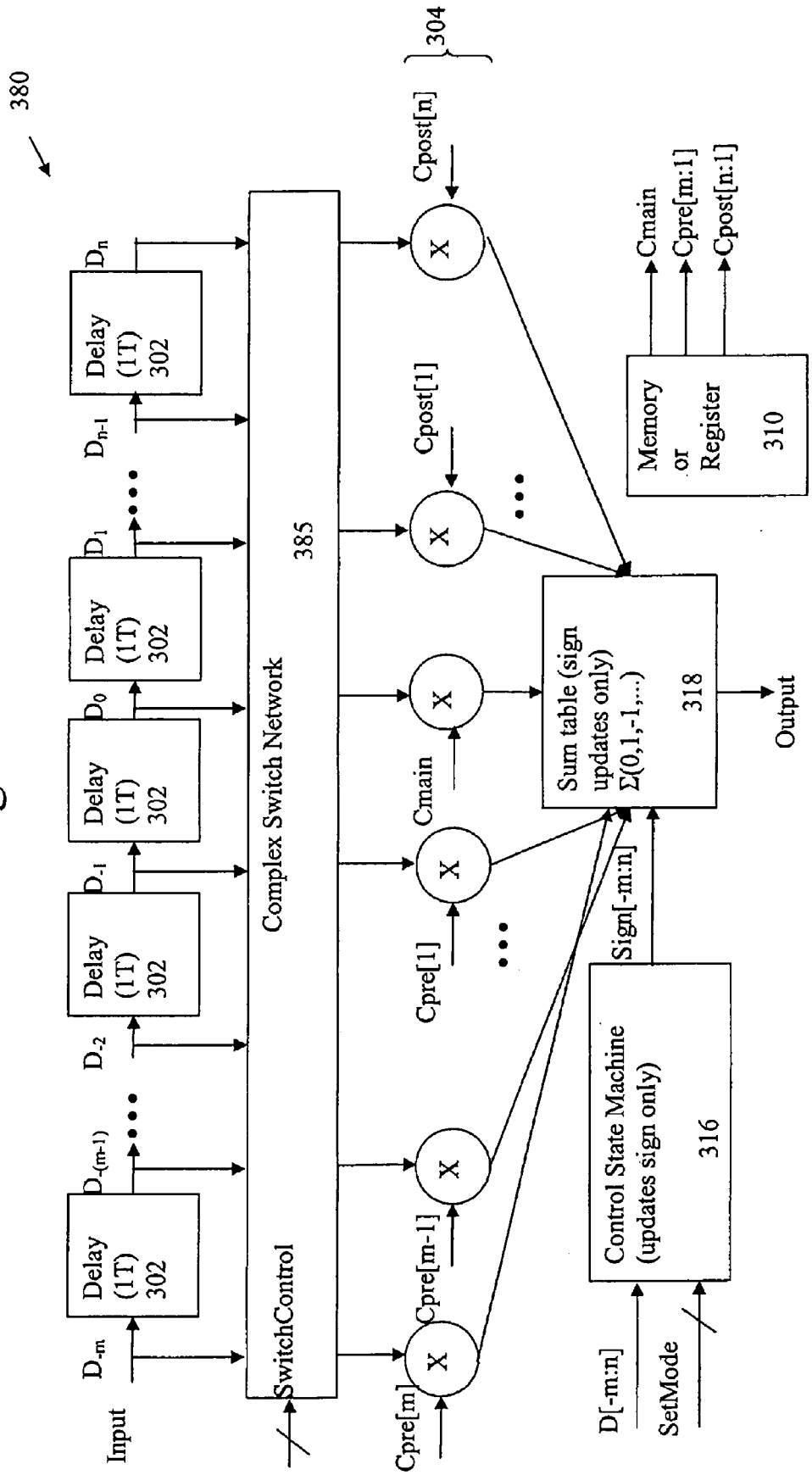

FIG. 3C shows another alternate embodiment of a tunable TPXE 380 of a SerDes 400 (see FIG. 4) according to the present invention. The tunable TPXE 380 is the same as the TPXE 350 of FIG. 3B except that it includes a complex switch network 385 connected between the delay elements 302 and the multipliers 304. The delay signals D[−m:n] are input into the complex switch network 385. The complex switch network 385 includes a switch control which inputs information regarding the signaling rate and other characteristics of backplane being emulated.

The purpose of the complex switch network 385 is to use the imbalance of tap coefficients Cpre[m:1]:Cmain:Cpost[1:n] to reduce the area and power required for the current sources (multipliers) 304. The complex switch network 385 can be a switch bar or a current source that is split among a number of data branches, having a "tiered" or "recursive" structure. When the dynamic Sign[−m:n] corresponding to a particular multiplier 304 is set to zero (effectively nullifying the current source 304 for that tap), that portion of the semiconductor that is allocated to that particular current source/multiplier 304 can be transferred via the complex switch network 385 to be utilized by another tap, effectively doubling the dynamic range for the other tap rather than idling a useful resource. Thus, the tunable TPXE 380 shown in FIG. 3C is able to model or cancel the ISI effect more closely and to achieve better system performance with only limited physical resources.

In a similar manner, a complex switching network could be used with the TPXE 300 of FIG. 3A to nullify multipliers 304 with small coefficients Cpre[m:1]:Cmain:Cpost[1:n] and to reallocate the current sources to other multipliers with high coefficients Cpre[m:1]:Cmain:Cpost[1:n].

Additional combinations of the embodiments shown in FIGS. 3A, 3B and 3C are intended to be part of this description though not expressly stated herein, and are intended to be within the spirit and scope of the invention. The Input signal and/or the Output signal can be a voltage entity, a current entity, or a combination of the two.

Figure 4:
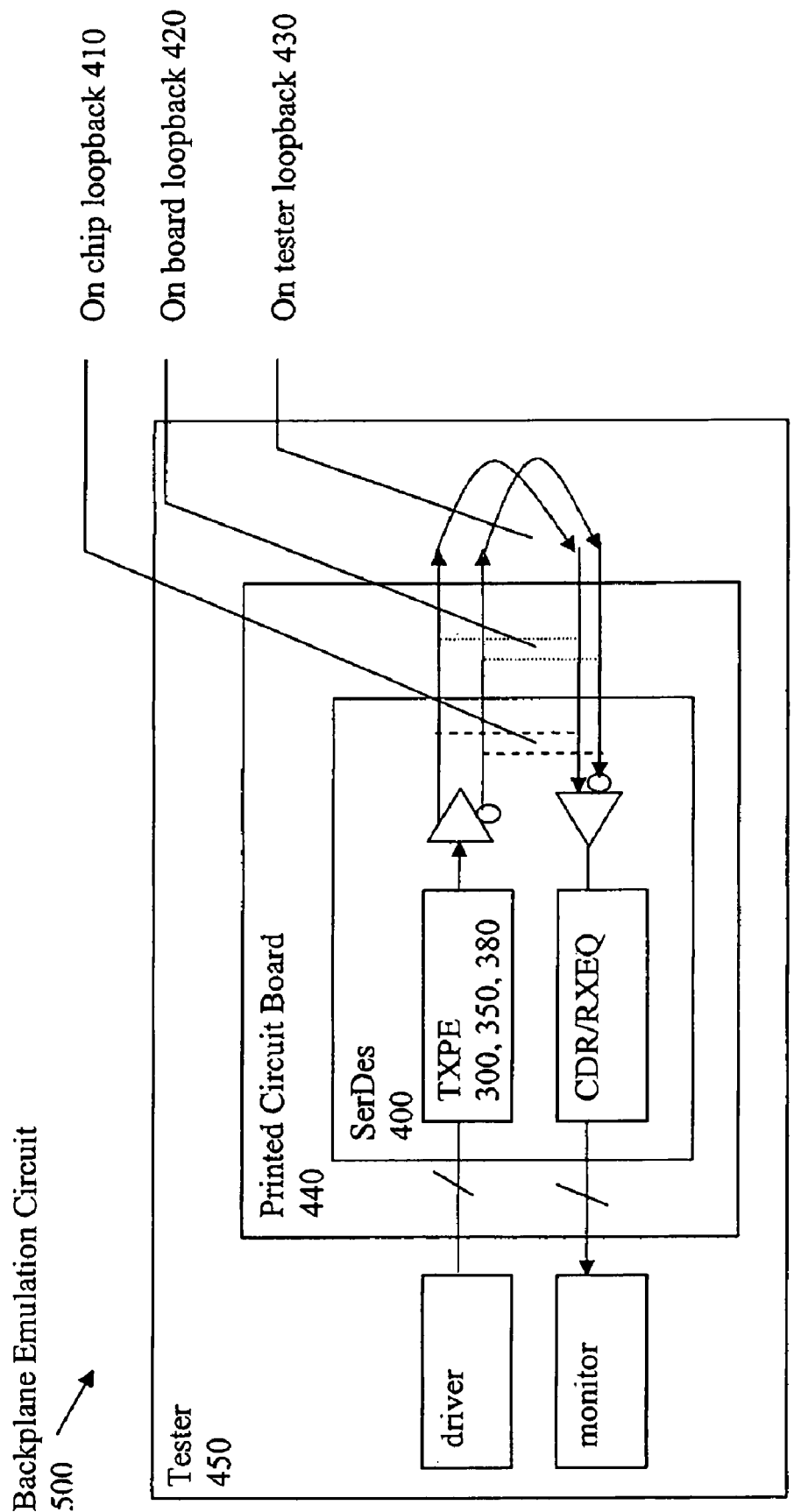
FIG. 4 shows one preferred embodiment of a backplane emulation circuit that includes a tunable TPXE according to the present invention.

FIG. 4 shows one preferred embodiment of a backplane emulation circuit 500 that includes a tunable TPXE according to the present invention, such as TPXE 300, TPXE 350, or TPXE 380. The TPXE 300, 350, 380 is digitally tuned in order to emulate a backplane and the signal generated by the TPXE 300, 350, 380 is physically connected to the input of the CDR/RXEQ. The connection between the TPXE and the CDR/RXEQ can be implemented on the SerDes chip 400 (see on chip loopback 410 in FIG. 4), on the PCB 440 (see on board loop back 420 in FIG. 4), or in the testing device 450 (see on tester loopback 530 in FIG. 4). With the TPXE 300, 350, 380 equipped with a cascaded backplane emulation function, ATE validations of the CDR and RXEQ circuits are greatly simplified. Horizontal timing variations will allow the CDR and RXEQ circuits to be more thoroughly and exhaustively tested, thus minimizing the chances of defective devices being shipped to customers and getting deployed in the field. As a result, the present invention can help avoid costly recall, and more importantly continuously support a supplier's reputation and ability to deliver the most reliable devices.

Additional alterations, modifications, and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

The invention claimed is:

1. A Serializer/DeSerializer (SerDes) comprising:
   a transmitter pre-emphasis circuit (TPXE), wherein said TXPE pre-emphasizes a transmitted signal in a first mode and injects inter-symbol interference in a second mode; and
   a receiver equalization circuit (RXEQ) that equalizes a received signal, wherein the TPXE includes one or more coefficients that are dynamically programmable.

2. The TPXE of claim 1 wherein the one or more coefficients have amplitudes that are dynamically programmable.

3. The TPXE of claim 1 wherein the one or more coefficients have signs that are dynamically programmable.

4. The TPXE of claim 1 wherein the one or more coefficients are dynamically programmed based on an input signal to the TPXE.

5. The TPXE of claim 1 wherein the one or more coefficients are dynamically programmed to emulate a backplane.

6. A SerDes testing circuit for testing the SerDes of claim 1, the SerDes testing circuit comprising:
   a loopback that connects the TPXE to the RXEQ, wherein the one or more coefficients of the TPXE are dynamically programmed so that the TPXE emulates a backplane, and wherein the integrity of the RXEQ is tested based on the signal generated by the TPXE.

7. A method of emulating a backplane using a Serializer/DeSerializer (SerDes):
   dynamically programming one or more coefficients of a transmitter pre-emphasis circuit (TPXE);
   pre-emphasizing a transmitted signal in the TPXE when a first mode of said TXPE is enabled and injecting inter-symbol interference when a second mode of said TXPE is enabled; and
   equalizing a received signal in a receiver equalization circuit (RXEQ).

8. The method of claim 7 wherein the one or more coefficients have amplitudes that are dynamically programmed.

9. The method of claim 7 wherein the one or more coefficients have signs that are dynamically programmed.

10. The method of claim 7 wherein the one or more coefficients are dynamically programmed based on an input signal to the TPXE.

11. The method of claim 7 wherein the one or more coefficients are dynamically programmed to emulate a backplane.

12. A method of testing a SerDes as in claim 7 comprising:
connecting an output of the TPXE to an input of the RXEQ;
dynamically programming the one or more coefficients of the TPXE so that the TPXE emulates a backplane; and
testing the integrity of the RXEQ based on a signal generated by the TPXE.

13. A Serializer/DeSerializer (SerDes) comprising:
a receiver equalization circuit (RXEQ) that equalizes a received signal; and
a transmitter pre-emphasis circuit (TPXE) that pre-emphasizes a transmitted signal, wherein the TPXE comprises:
  a control state machine that dynamically programs one or more coefficients based on a signal input to the TPXE;
  delay elements that delay a signal input to the TPXE;
  at least one multiplier that multiplies at least one of the delayed signals by at least one of the dynamically programmed coefficients; and
  a summing element that sums the multiplied signals.

14. The SerDes of claim 13, wherein the TPXE further comprises:
a memory that stores the one or more coefficients, wherein one or more of the delayed signals are multiplied by one or more of the stored coefficients.

15. The TPXE of claim 13 wherein the one or more coefficients have amplitudes that are dynamically programmable.

16. The TPXE of claim 13 wherein the one or more coefficients have signs that are dynamically programmable.

17. The TPXE of claim 13 wherein the one or more coefficients are dynamically programmed to emulate a backplane.

18. A SerDes testing circuit for testing the SerDes of claim 13, the SerDes testing circuit comprising:
a loopback that connects the TPXE to the RXEQ, wherein the one or more coefficients of the TPXE are dynamically programmed so that the TPXE emulates a backplane, and wherein the integrity of the RXEQ is tested based on the signal generated by the TPXE.

19. The SerDes of claim 13, wherein the TPXE further comprises:
a complex switch network that inputs current to the multipliers, wherein the complex switch network can reallocate current from a first multiplier to a second multiplier based on the one or more coefficients of the TPXE.

20. A SerDes testing circuit for testing the SerDes of claim 19, the SerDes testing circuit comprising:
a loopback that connects the TPXE to the RXEQ, wherein the one or more coefficients of the TPXE are dynamically programmed so that the TPXE emulates a backplane, and wherein the integrity of the RXEQ is tested based on the signal generated by the TPXE.

* * * * *